United States Patent
Yu et al.

(10) Patent No.: US 10,612,554 B2
(45) Date of Patent: Apr. 7, 2020

(54) METHOD AND DEVICE FOR CONTROLLING ROTATION ANGLE OF SWINGING HEAD OF FAN, AND FAN

(71) Applicants: BEIJING XIAOMI MOBILE SOFTWARE CO., LTD., Beijing (CN); BEIJING SMARTMI TECHNOLOGY CO., LTD., Beijing (CN)

(72) Inventors: Jiuping Yu, Beijing (CN); Dongxu Liu, Beijing (CN)

(73) Assignees: Beijing Xiaomi Mobile Software Co., Ltd., Beijing (CN); Beijing Smartmi Technology Co., Ltd., Beijing (CN)

( * ) Notice: Subject to any disclaimer, the term of this patent is extended or adjusted under 35 U.S.C. 154(b) by 15 days.

(21) Appl. No.: 15/978,741

(22) Filed: May 14, 2018

(65) Prior Publication Data

US 2018/0335041 A1 Nov. 22, 2018

(30) Foreign Application Priority Data

May 16, 2017 (CN) .......................... 2017 1 0344018

(51) Int. Cl.
*F04D 25/10* (2006.01)
*F04B 35/04* (2006.01)
(Continued)

(52) U.S. Cl.
CPC .......... *F04D 25/105* (2013.01); *F04D 27/00* (2013.01); *F04D 27/002* (2013.01); *G01D 5/165* (2013.01);
(Continued)

(58) Field of Classification Search
CPC ........ F04D 25/105; F04B 35/04; F24F 7/007; H02P 25/03
See application file for complete search history.

(56) References Cited

U.S. PATENT DOCUMENTS

2002/0182075 A1 12/2002 Pan
2004/0065268 A1* 4/2004 Terrell ................ A01K 1/0082
119/448
(Continued)

FOREIGN PATENT DOCUMENTS

CN 2148204 12/1993
CN 104750124 7/2015
(Continued)

OTHER PUBLICATIONS

European Extended Search Report issued in EP Patent Application No. 18172559.9, dated Sep. 12, 2018, 10 pages.
(Continued)

*Primary Examiner* — Cortez M Cook
(74) *Attorney, Agent, or Firm* — Arch & Lake LLP (57) ABSTRACT

A method and a device are provided for controlling a rotation angle of a swinging head of a fan. The method may be applied in a fan adopting a brushless motor. An angle feedback device is arranged on the swinging head, and the swinging head is driven by the brushless motor to rotate. The device may acquire a parameter outputted by the angle feedback device, where the parameter varies with rotation of the swinging head. The device may calculate a current rotation angle of the swinging head according to the parameter outputted by the angle feedback device and a preset correspondence relationship between parameters and angles. The device may control the swinging head to rotate according to the current rotation angle of the swinging head and a preset target rotation angle.

15 Claims, 5 Drawing Sheets

(51) Int. Cl.
*F24F 7/007* (2006.01)
*H02P 25/03* (2016.01)
*F04D 27/00* (2006.01)
*G01D 5/165* (2006.01)
*G01D 5/347* (2006.01)
*G01D 5/40* (2006.01)

(52) U.S. Cl.
CPC ............ *G01D 5/3473* (2013.01); *G01D 5/40* (2013.01); *H02P 25/03* (2016.02)

(56) References Cited

U.S. PATENT DOCUMENTS

| | | | |
|---|---|---|---|
| 2011/0008190 A1* | 1/2011 | Lee | F04D 25/084 417/410.1 |
| 2013/0036985 A1* | 2/2013 | Gordon | A01K 1/0052 119/448 |

FOREIGN PATENT DOCUMENTS

| | | |
|---|---|---|
| CN | 204827985 U * | 12/2015 |
| CN | 106015061 | 10/2016 |
| CN | 106301096 | 1/2017 |
| CN | 106385209 | 2/2017 |
| DE | 10326606 | 1/2005 |
| EP | 1164295 | 12/2001 |
| JP | S6213797 | 1/1987 |
| JP | 2002359991 | 12/2002 |

OTHER PUBLICATIONS

Kevin Lynch, "Embedded computing and Mechatronics with the PIC32 Microcontroller," Dec. 8, 2015, Elsevier Science and Technology, pp. 323-326.

* cited by examiner

METHOD AND DEVICE FOR CONTROLLING ROTATION ANGLE OF SWINGING HEAD OF FAN, AND FAN

CROSS-REFERENCE TO RELATED APPLICATION

This application is based on and claims priority to Chinese Patent Application No. 201710344018.7, filed on May 16, 2017, the entire contents of which are incorporated herein by reference.

TECHNICAL FIELD

The present disclosure relates to communication technologies, and more particularly, to a method and a device for controlling a rotation angle of a swinging head of a fan, and a fan.

BACKGROUND

Fans are common electrical appliances in people's daily life, and theirs types are various. From an installation position point of view, the fan may include a ceiling fan, a desk fan, a floor fan, etc. From a swinging point of view, the fan may be divided into a fan with a swingable head and a fan with a non-swingable head. For a user whose indoor seats are relatively scattered, the fan with the swingable head provides a lot of convenience for the user to enjoy the cool air.

For the current fan with the swingable head, the rotation angle of the swinging head can be controlled freely. There are many ways to control the rotation angle, and the most direct way is to use a stepping motor to control the rotation angle. However, the service life of the stepping motor is usually only thousands of hours, and it is difficult to meet requirements of the user.

SUMMARY

According to a first aspect of the present disclosure, there is provided a method for controlling a rotation angle of a swinging head of a fan. The method is applied in the fan adopting a brushless motor. An angle feedback device is arranged on the swinging head. The swinging head is driven by the brushless motor to rotate. The method includes acquiring a parameter outputted by the angle feedback device, in which, the parameter outputted by the angle feedback device varies with rotation of the swinging head; calculating a current rotation angle of the swinging head according to the parameter outputted by the angle feedback device and a preset correspondence relationship between parameters and angles; and controlling the swinging head to rotate according to the current rotation angle of the swinging head and a preset target rotation angle by using the brushless motor.

According to a second aspect of the present disclosure, there is provided a fan, including a processor, a memory configured to store instructions executable by the processor, an angle feedback device and a brushless motor. The processor is configured to: acquire a parameter outputted by the angle feedback device, in which, the parameter outputted by the angle feedback device varies with rotation of the swinging head; calculate a current rotation angle of the swinging head according to the parameter outputted by the angle feedback device and a preset correspondence relationship between parameters and angles; and control the swinging head to rotate according to the current rotation angle of the swinging head and a preset target rotation angle.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Through the above-mentioned drawings, the embodiments of the present disclosure are illustrated, and reference will be made in detail below. These drawings and textual descriptions are not intended to limit the scope of the conception of the present disclosure in any way, but rather to explain the concept of the present disclosure to those skilled in the art by specific exemplary embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
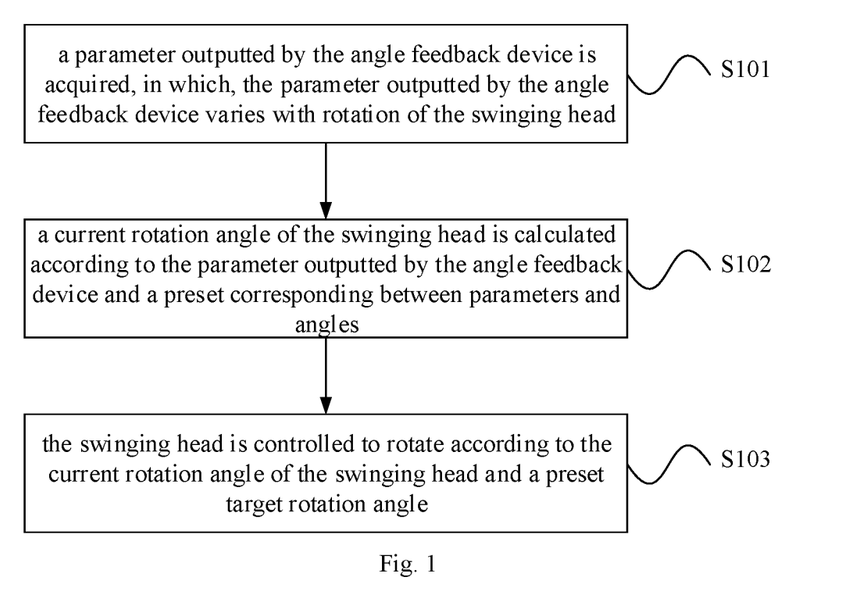
FIG. 1 is a flow chart illustrating a method for controlling a rotation angle of a swinging head of a fan according to an aspect of the disclosure.

FIG. 1 is a flow chart illustrating a method for controlling a rotation angle of a swinging head of a fan according to an aspect of the disclosure. The method for controlling the rotation angle of the swinging head is applied to a control device for controlling the swinging head of the fan to swing. Alternatively, the control device may be a processor or a microcontroller built into the fan. The present embodiment relates to a process in which the control device calculates a current rotation angle of the swinging head according to a parameter outputted by an angle feedback device arranged on the swinging head, and then controls the swinging head to rotate according to the rotation angle. In the present embodiment, the fan adopts a brushless motor, the angle feedback device is arranged on the swinging head, and the swinging head is driven by the brushless motor to rotate.

Before introducing embodiments of the present disclosure, an application scenario for the embodiments of the present disclosure is introduced first.

The fan with a swingable head is a common electronic appliance in daily life, a rotation shaft of the swinging head of the fan is driven by the motor to rotate, so as to drive the swinging head to swing. The current fan with the swingable head uses a stepping motor to control the rotation angle of the swinging head. However, the service life of the stepping motor is usually only thousands of hours, and it is difficult to meet requirements of the user.

The present disclosure uses the brushless motor as the driving force to drive the swinging head to swing, the rotation angle of the swinging head is controlled according to the parameter fed back by the angle feedback device. Since the brushless motor has the advantages of long service life, the requirement of the user is satisfied. At the same time, by setting the angle feedback device, disadvantages that the brushless motor cannot control the rotation angle of the swinging head are solved. Therefore, the embodiments of the present disclosure not only prolong the service life of the fan, but also accurately control the rotation angle of the swinging head. For specific implementation process of the method, reference may be made to descriptions of the following embodiments.

As illustrated in FIG. 1, the method may include the following blocks.

At block S101, a parameter outputted by the angle feedback device is acquired. The parameter outputted by the angle feedback device varies with rotation of the swinging head.

The fan involved in this act is the fan with the swinging head, and the fan may be a floor fan, or may be a desk fan. When the fan is turned on, the user sets a target rotation angle of the fan. In at least one embodiment, the user may set the target rotation angle of the fan through an application software associated with the fan. That is, the fan in this embodiment may wirelessly communicate with a mobile terminal of the user to acquire the target rotation angle set by the user. In at least one embodiment, the user may also set the target rotation angle of fan through a gear on the fan. After the fan is turned on, the swinging head is driven by the brushless motor to swing, and with the rotation of the swinging head, the parameter outputted by the angle feedback device arranged on the swinging head to the control device of the fan may varies. That is, the control device may acquire the parameter outputted by the angle feedback device. In one or more embodiments, the parameter may be a voltage outputted by the angle feedback device, or may be a pulse signal or a digital signal outputted by the angle feedback device.

Figure 2:
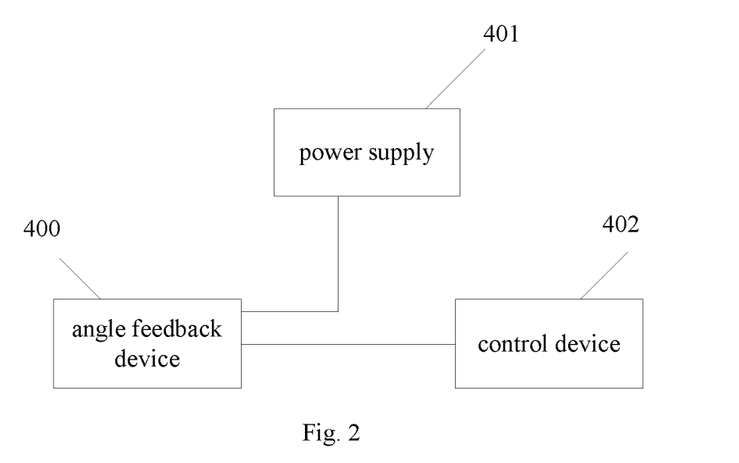
FIG. 2 is a block diagram illustrating a circuit structure according to an aspect of the disclosure.

In at least one embodiment, referring to the block diagram of the circuit structure illustrated in FIG. 2, the angle feedback device 400 is electrically connected with a power supply 401 and a control device 402. The control device may be the microcontroller integrated in the fan.

At block S102, a current rotation angle of the swinging head is calculated according to the parameter outputted by the angle feedback device and a preset correspondence relationship between parameters and angles.

In this act, after the control devices acquires the parameter outputted by the angle feedback device, since the correspondence relationship between the parameter and the angles is preset in the control device, the control device may calculate the current rotation angle of the swinging head based on the preset correspondence relationship and the parameter outputted by the angle feedback device. In one or more embodiments, the preset correspondence relationship may include a correspondence relationship between different parameters and angles. The correspondence relationship may also include an angle corresponding to a unit parameter. For example, when the parameter is a voltage, the correspondence relationship may be a correspondence relationship between different voltages and different angles, and may also be an angle corresponding to an average voltage per volt (i.e., a unit voltage).

At block S103, the swinging head is controlled to rotate according to the current rotation angle of the swinging head and a preset target rotation angle. The brushless motor may drive the swinging head to rotate via a motor transmission or other device. For example, the control device may send an instruction to the brushless motor to switch direction when a difference between the current rotation angel and the preset target rotation angle is less than a preset threshold. The preset threshold may be a small number or zero in some embodiments.

In this act, since the user preset the target rotation angle of the swinging head, after the control device calculates the current rotation angle of the swinging head, the control device can compare the current rotation angle of the swinging head with the target rotation angle. That is, the control device can determine whether the current rotation angle reaches the target rotation angle set by the user, so as to control the swinging head to rotate according to the result using the brushless motor.

The present disclosure provides a method for controlling the rotation angle of the swinging head of the fan. The method uses the brushless motor to drive the swinging head to swing in the process of swinging. The parameter outputted by the angle feedback device varies with rotation of the swinging head. The control device of the fan can acquire the parameter outputted by the angle feedback device in real time. The control device can calculate the current rotation angle of the swinging head according to the parameter outputted by the angle feedback device and the preset correspondence relationship between parameters and angles. The control device can then control the swinging head to rotate according to the current rotation angle of the swinging head and the preset target rotation angle. In the present disclosure, since the brushless motor has advantages of long service life, the requirement of the user is satisfied, and at the same time, by setting the angle feedback device, disadvantages that the brushless motor cannot control the rotation angle of the swinging head are solved. Therefore, the embodiments of the present disclosure prolong the service life of the fan. The embodiments also accurately control the rotation angle of the swinging head, thereby improving the user experience.

In one or more embodiments, the control process of the control device controlling the swinging head to rotate according to the current rotation angle of the swinging head and the preset target rotation angle may be as follows. When the current rotation angle of the swinging head is less than the target rotation angle, the swinging head is controlled to continue to rotate in a current direction. When the current rotation angle of the swinging head is greater than or equal to the target rotation angle, the swinging head is controlled to rotate in a direction opposite to the current direction.

In an alternative embodiment, when the control device determines that the current rotation angle of the swinging head is less than the target rotation angle, the control device controls the swinging head to continue to rotate in the current direction. It should be noted that, when the control device controls the swinging head to continue to rotate in the current direction, the angle feedback device may still output different parameters in real time as the rotation of the swinging head, and the control device may also continue to acquire the parameter outputted by the angle feedback device, and then calculate the current rotation angle of the swinging head according to the parameter, so as to continuously control the swinging head to rotate. Similarly, when the control device determines that the current rotation angle of the swinging head is greater than or equal to the target rotation angle, the control device controls the swinging head to rotate in the direction opposite to the current direction. In the process of the control device controlling the swinging head to rotate in the direction opposite to the current direction, the control device may also continuously control the swinging head to rotate.

In at least one embodiment, when the current rotation angle of the swinging head is greater than or equal to the target rotation angle, the control device may control the swinging head to stop rotating first, and then control the swinging head to rotate in the direction opposite to the current direction after a preset time period, so that the brushless motor may have a short rest during the preset time period, thereby avoiding damage of the brushless motor due to uninterrupted work for a long time. For example, the preset time period may be set as any value that is less than or equal to 2 seconds. More specifically, the preset time period may be about 1 second, 0.5 second, or 0.2 second.

In the above alternative embodiment, the control device can control the swinging head to rotate in real time and accurately based on the calculated current rotation angle of the swinging head and the target rotation angle, thereby improving an accuracy of the rotation of the swinging head.

Figure 3:
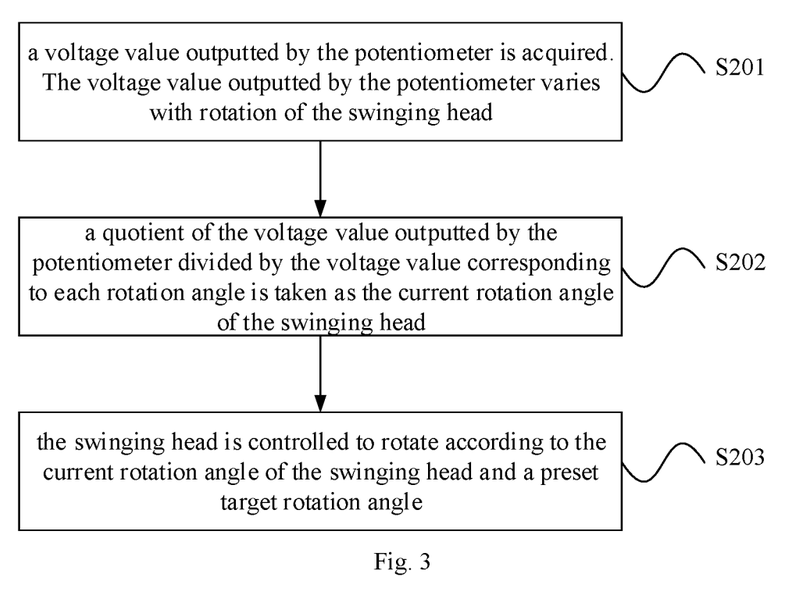
FIG. 3 is a flow chart illustrating a method for controlling a rotation angle of a swinging head of a fan according to another aspect of the disclosure.

FIG. 3 is a flow chart illustrating a method for controlling a rotation angle of a swinging head of a fan according to another aspect of the disclosure. The present embodiment relates to a specific process of the control device calculating the current rotation angle of the swinging head when the angle feedback device is a potentiometer. As illustrated in FIG. 3, the method includes the following blocks.

At block S201, a voltage value outputted by the potentiometer is acquired. The voltage value outputted by the potentiometer varies with rotation of the swinging head.

At block S202, a quotient of the voltage value outputted by the potentiometer divided by the voltage value corresponding to each rotation step is taken as the current rotation angle of the swinging head.

At block S203, the swinging head is controlled to rotate according to the current rotation angle of the swinging head and a preset target rotation angle. Here, the control device may control the swinging head to rotate using the brushless motor.

Figure 4:
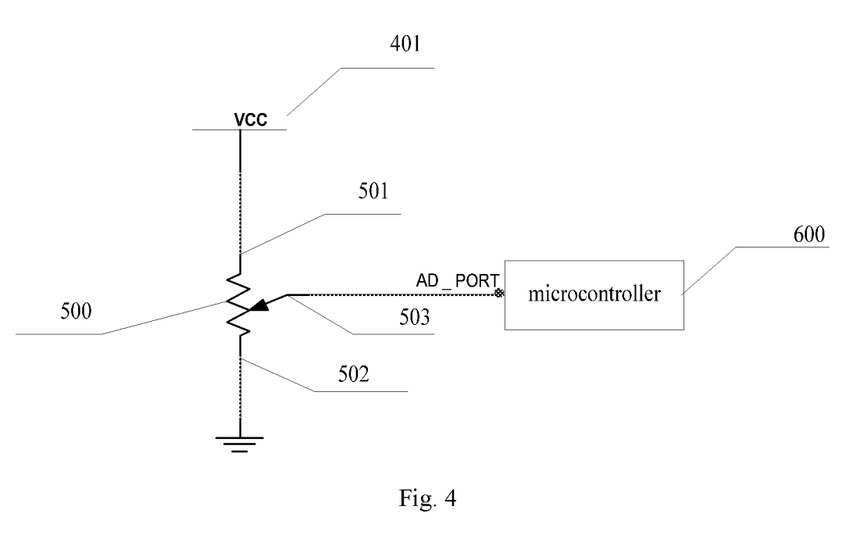
FIG. 4 is a block diagram illustrating a circuit structure according to another aspect of the disclosure.

In this example, the angle feedback device is a potentiometer 500, the parameter outputted by the angle feedback device is a voltage value outputted by the potentiometer 500. The above correspondence relationship may include a voltage value corresponding to each rotation step.

Here, the "each rotation step" may be a custom angle step, for example, the "each rotation step" may be 1°, may be 0.5°, and may also be other angle values preset by the control device. In at least one embodiment, the above control device may be a microcontroller 600 integrated in the fan, two ports (501 and 502 respectively) of the potentiometer 500 are respectively connected with positive and negative poles of the internal power supply 401, and a center tap 503 of the potentiometer 500 is electrically connected with a AD_PORT of the microcontroller 600, the details can refer to the circuit structure illustrated in FIG. 4. In at least one embodiment, the potentiometer 500 may be a rotary potentiometer. The rotary potentiometer sleeves on the rotation shaft of the swinging head, and a rotatable part of the rotary potentiometer rotates with the rotation of the swinging head, so that the voltage value outputted by the center tap of the potentiometer varies with the rotation of the swinging head. In this way, the control device can collect the voltage outputted by the potentiometer in real time through a corresponding interface. For example, the microcontroller can collect the voltage outputted by the potentiometer through an AD port. It should be noted that, the maximum value of the power supply voltage in FIG. 4 is less than or equal to the maximum voltage value that can be identified by the AD_PORT of the microcontroller.

In addition, the above correspondence relationship is preset in the above control device, and the correspondence relationship is the voltage value corresponding to each rotation step. As described above, the "each rotation step" here may be a custom angle, for example, the "each rotation step" may be 1°, may be 0.5°, and may also be other angle values. The correspondence relationship may be acquired through research and development tests in a development phase of the fan, the specific process acquisition process may be as follows. After the fan is fixed, the swinging head may be tested to swing first, when the rotation angle of the swinging head is 0 degree, the voltage outputted by the potentiometer is tested to be $V_0$, and when the swinging head is continued to be controlled to rotate to the maximum angle, the voltage outputted by the potentiometer is tested to be $V_N$, and finally a sample voltage value $V_X$ corresponding to each rotation step is obtained according to a formula of $$V_X = \frac{(V_N - V_0)}{N},$$

and the precision control can reach 1 degree ($V_X$ actually refers to the voltage value corresponding to per degree). Certainly, when a higher precision is needed, $V_N$ can be divided into a larger value equally (for example, divided into 2N equally), the formula may $$\text{be } V_X' = \frac{(V_N - V_0)}{2N},$$

the precision control can reach 0.5 degree, and $V_X'$ actually refers to the voltage value corresponding to per 0.5 degree.

In this way, after the control device acquires the voltage value outputted by the potentiometer, the control device can take the quotient of the voltage value divided by the voltage value corresponding to each rotation step as the current rotation angle of the swinging head. In at least one embodiment, when the above "voltage value corresponding to each rotation step" is that of corresponding to per degree (i.e., the foregoing $V_X$), the control device can obtain the current rotation angle of the swinging head by dividing the voltage value outputted by the potentiometer by $V_X$. In at least one embodiment, when the above "voltage value corresponding to each rotation step" is that of corresponding to per 0.5 degree (i.e., the foregoing $V_X'$), the control device can obtain the current rotation angle of the swinging head by dividing the voltage value outputted by the potentiometer by $V_X'$ and multiplying by 2. For the "voltage value corresponding to each rotation step" is that of corresponding to other angles, a similar method can be used to obtain the current rotation angle of the swinging head. Based on this, the control device can acquire how many degrees the swinging head has rotated currently, and then precisely control the rotation of the swinging head based on the above target rotation angle.

With the method for controlling the rotation angle of the swinging head of the fan according to embodiments of the present disclosure, by using the potentiometer as the angle feedback device, the potentiometer and the brushless motor are cooperated to enable the brushless motor to drive the swinging head to swing, in the process of swinging, the voltage outputted by the potentiometer varies with the rotation of the swinging head, the control device of the fan can acquire the voltage outputted by the potentiometer in real time, and calculate the current rotation angle of the swinging head according to the quotient of the voltage value outputted by the potentiometer and the voltage value corresponding to each rotation step, and then control the swinging head to rotate according to the current rotation angle of the swinging head and the preset target rotation angle. In the present embodiment, since the brushless motor has the advantages of long service life, the requirement of the user is satisfied, and at the same time, by setting the potentiometer, the disadvantages that the brushless motor cannot control the rotation angle of the swinging head are solved. Therefore, the embodiments of the present disclosure not only prolong the service life of the fan, but also accurately control the rotation angle of the swinging head, thereby improving the user experience.

Figure 5:
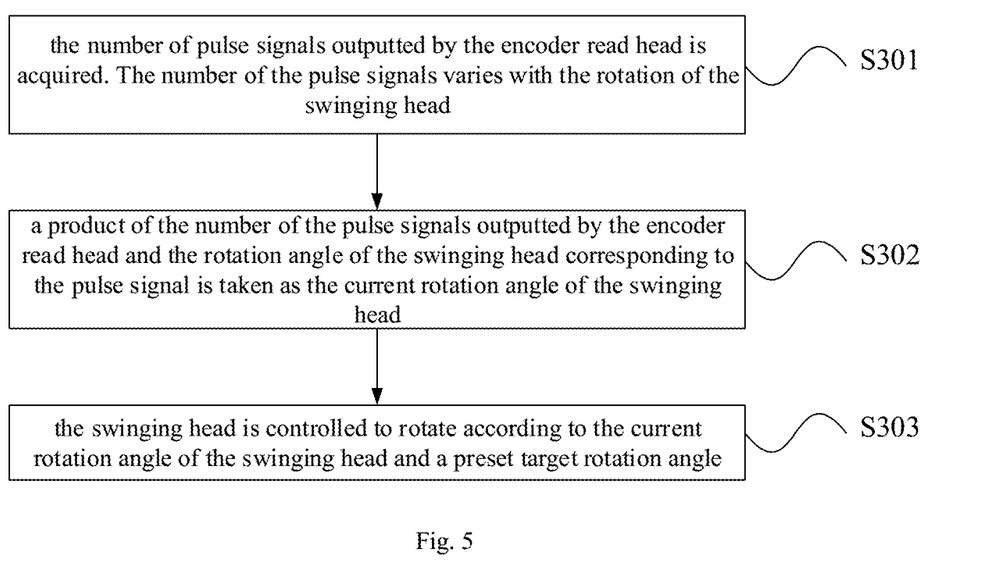
FIG. 5 is a flow chart illustrating a method for controlling a rotation angle of a swinging head of a fan according to another aspect of the disclosure.

FIG. 5 is a flow chart illustrating a method for controlling a rotation angle of a swinging head of a fan according to another aspect of the disclosure. The present embodiment relates a specific process of the control device calculating the current rotation angle of the swinging head when the angle feedback device is an infrared photoelectric rotary encoder and an encoder read head. As illustrated in FIG. 5, the method includes the following blocks.

At block S301, the number of pulse signals outputted by the encoder read head is acquired. The number of the pulse signals varies with the rotation of the swinging head.

At block S302, a product of the number of the pulse signals outputted by the encoder read head and the rotation angle of the swinging head corresponding to the pulse signal is taken as the current rotation angle of the swinging head.

At block S303, the swinging head is controlled to rotate according to the current rotation angle of the swinging head and a preset target rotation angle.

Figure 6:
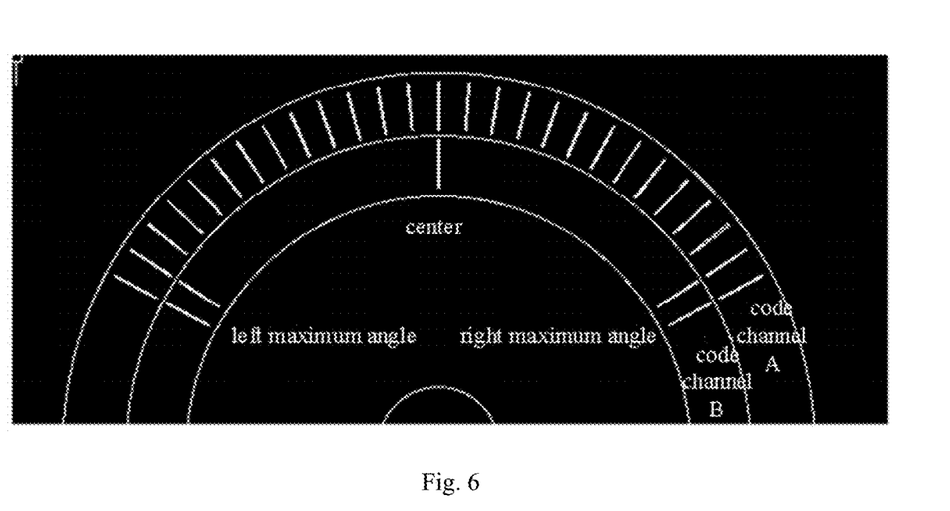
FIG. 6 is a block diagram illustrating a structure of a part of an infrared photoelectric rotary encoder according to another aspect of the disclosure.

In one or more embodiments, a block diagram of a part of a structure of the infrared photoelectric rotary encoder is illustrated in FIG. 6. The infrared photoelectric rotary encoder includes two code channels of a code channel A and a code channel B. The infrared photoelectric rotary encoder may sleeve on the rotation shaft of the swinging head, and a rotatable part of the infrared photoelectric rotary encoder rotates with the rotation of the swinging head. In addition, the setting manner of the infrared photoelectric rotary encoder and encoder read head can refer to an installation manner in the related art, as long as the encoder read head can generate the pulse signal according to the read scale of the infrared photoelectric rotary encoder.

Figure 7:
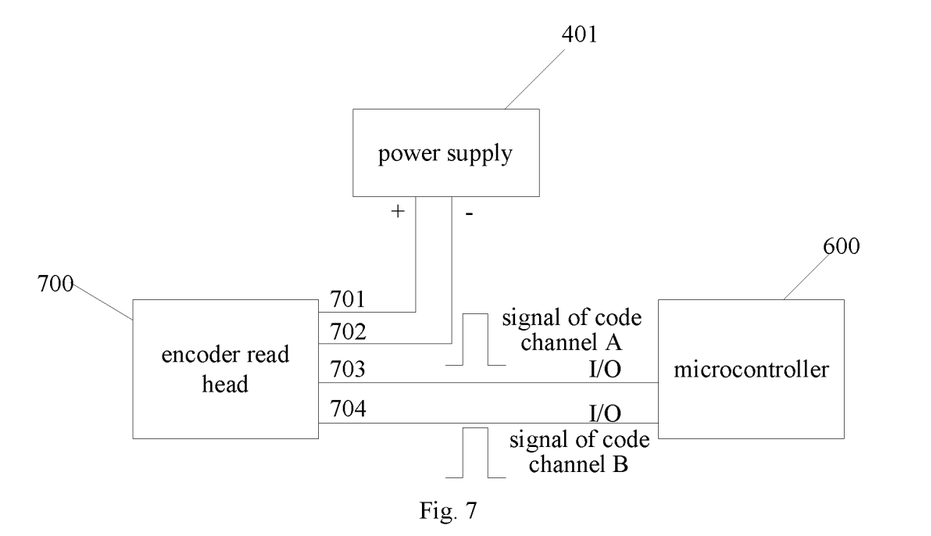
FIG. 7 is a block diagram illustrating a circuit structure according to another aspect of the disclosure.

FIG. 7 is a schematic diagram of a circuit structure of an infrared photoelectric rotary encoder, an encoder read head and a control device of the fan. In FIG. 7, the encoder read head 700 includes four ports, of where two ports (701 and 702, respectively) are connected with the internal power supply 401 of the fan. Here, the maximum value of the voltage outputted by the power supply is less than or equal to the maximum voltage value that can be identified by the AD port of the microcontroller. Another two ports of the rotary encoder (703 and 704, respectively) correspond to the code channel A and the code channel B of the infrared photoelectric rotary encoder, respectively, and the two ports are connected with the control device, respectively. In at least one embodiment, the control device may be the microcontroller integrated in the fan, the port 703 corresponding to the code channel A and the port 704 corresponding to the code channel B on the encoder read head are connected with an input and output (I/O) port of the microcontroller 600. Based on this, the microcontroller 600 can collect the number of the pulse signals outputted by the port 703 corresponding to the code channel A and by the port 704 corresponding to the code channel B on the encoder read head 700.

Based on FIG. 7, the parameter outputted by the angle feedback device is the pulse signal outputted by the encoder read head according to the change of the scale of the infrared photoelectric rotary encoder, and the above corresponding is the rotation angle of the swinging head corresponding to one pulse signal. Combining with FIG. 6, when the control device acquires pulse signals outputted by the port corresponding to the code channel A and by the port corresponding to the code channel B at the same time, the control device learns that the swinging head is rotated to the center of the maximum rotation angle currently. In this case, the infrared photoelectric rotary encoder continues to rotate with the rotation of the swinging head, and the encoder read head continues to read the scale on the infrared photoelectric rotary encoder to output the pulse signal. In this case, only the port corresponding to the code channel A on the encoder read head outputs the pulse signal, and since there is no scale on the code channel B, the port corresponding to the code channel B cannot output the pulse signal. In this case, the control device constantly detects the pulse signal on the port corresponding to the code channel A and the port corresponding to the code channel B on the encoder read head, when it is determined that the swinging head swings to the central position, the control device starts to calculate the number of the pulse signals outputted by the port corresponding to the code channel A on the encoder read head. Since a pulse signal corresponds to a fixed rotation angle, the control device takes the product of the number of pulse signals outputted by the port corresponding to the code channel A on the encoder read head and the rotation angle of the swinging head corresponding to one pulse signal as the current rotation angle of the swinging head. Based on this, the control device can acquire how many degrees the swinging head has rotated currently, and then precisely control the rotation of the swinging head based on the above target rotation angle.

Furthermore, when the control device collects two or more pulse signals simultaneously on the port corresponding to the code channel A and the port corresponding to the code channel B, the control device learns that the swinging head is rotated to the position of the maximum rotation angle (according to the direction illustrated in FIG. 6, it indicates that the swinging head rotates to the left maximum angle or the right maximum angle), and cannot rotate in the current direction. In this case, the control device controls the swinging head to rotate in the direction opposite to the current direction.

With the method for controlling the rotation angle of the swinging head of the fan according to embodiments of the present disclosure, by using the infrared photoelectric rotary encoder and the encoder read head as the angle feedback device, the infrared photoelectric rotary encoder, the encoder read head and the brushless motor are cooperated to enable the brushless motor to drive the swinging head to swing, in the process of swinging, the number of the pulse signals outputted by the encoder read head varies with the rotation of the swinging head, the control device of the fan can acquire the pulse signal outputted by the encoder read head in real time, and calculate the current rotation angle of the swinging head according to the product of the number of the pulse signals outputted by the encoder read head and the rotation angle of the swinging head corresponding to the pulse signal, and then control the swinging head to rotate according to the current rotation angle of the swinging head and the preset target rotation angle. In the present embodiment, since the brushless motor has the advantages of long service life, the requirement of the user is satisfied, and at the same time, by setting the infrared photoelectric rotary encoder and the encoder read head, the disadvantages that the brushless motor cannot control the rotation angle of the swinging head are solved. Therefore, the embodiments of the present disclosure cannot only prolong the service life of the fan, but also accurately control the rotation angle of the swinging head, thereby improving the user experience.

The following is device embodiments of the present disclosure, which can be used to perform the method embodiments of the present disclosure. For those technical details not disclosed in the device embodiments of the present disclosure, the method embodiments of the present disclosure may be referred to.

Figure 8:
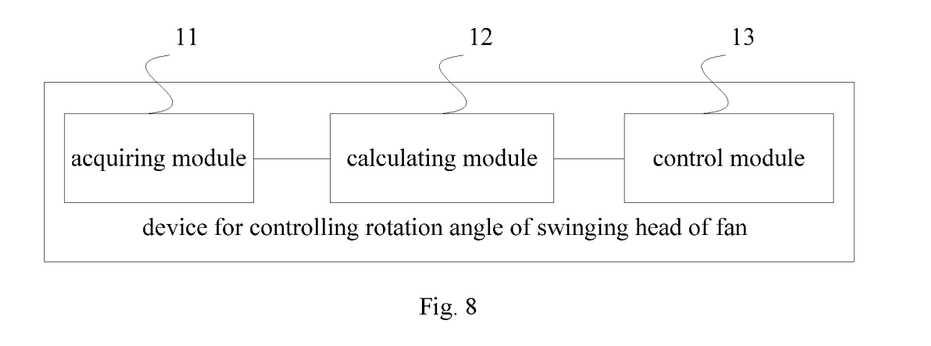
FIG. 8 is a block diagram illustrating a device for controlling a rotation angle of a swinging head of a fan according to an aspect of the disclosure.

FIG. 8 is a block diagram illustrating a device for controlling a rotation angle of a swinging head of a fan according to an aspect of the disclosure, and the device can be implemented by software, hardware or a combination of the two. The device is applied in the fan adopting a brushless motor, an angle feedback device is arranged on the swinging head, and the swinging head is driven by the brushless motor to rotate. As illustrated in FIG. 8, the device includes an acquiring module 11, a calculating module 12 and a control module 13.

The acquiring module 11 is configured to acquire a parameter outputted by the angle feedback device. The parameter outputted by the angle feedback device varies with rotation of the swinging head.

The calculating module 12 is configured to calculate a current rotation angle of the swinging head according to the parameter outputted by the angle feedback device and a preset correspondence relationship between parameters and angles.

The control module 13 is configured to control the swinging head to rotate according to the current rotation angle of the swinging head and a preset target rotation angle.

As described above, with the device for controlling the rotation angle of the swinging head of the fan according to embodiments of the present disclosure, by using the brushless motor to drive the swinging head to swing, in the process of swinging, the parameter outputted by the angle feedback device varies with rotation of the swinging head, the acquiring module can acquire the parameter outputted by the angle feedback device in real time, and the calculating module can calculate the current rotation angle of the swinging head according to the parameter outputted by the angle feedback device and the preset correspondence relationship between parameters and angles, so that the control module can control the swinging head to rotate according to the current rotation angle of the swinging head and the preset target rotation angle. In the present embodiment, since the brushless motor has advantages of long service life, the requirement of the user is satisfied, and at the same time, by setting the angle feedback device, disadvantages that the brushless motor cannot control the rotation angle of the swinging head are solved. Therefore, the embodiments of the present disclosure cannot only prolong the service life of the fan, but also accurately control the rotation angle of the swinging head, thereby improving the user experience.

Figure 9:
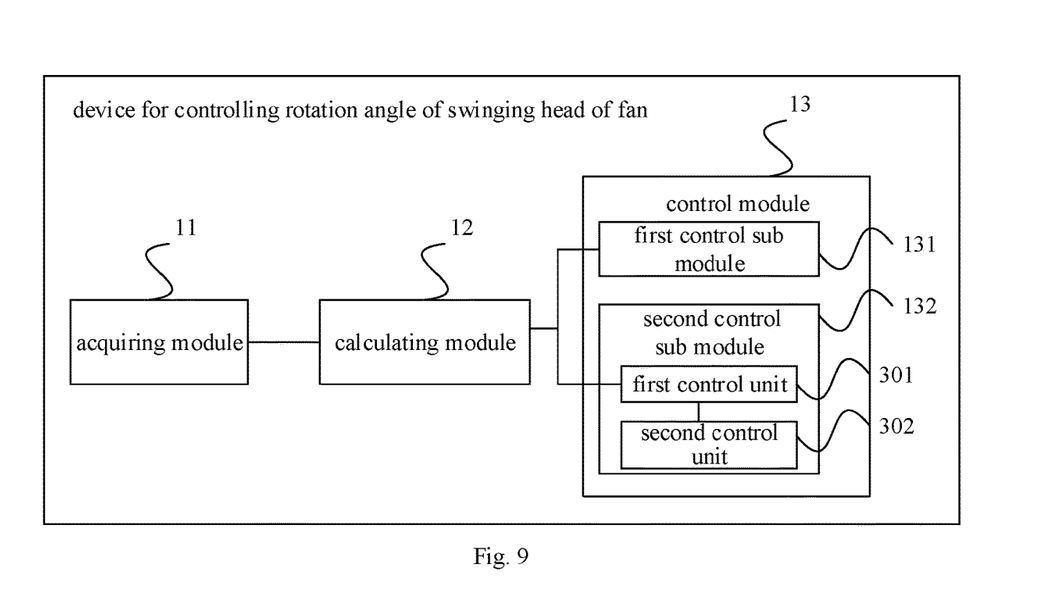
FIG. 9 is a block diagram illustrating a device for controlling a rotation angle of a swinging head of a fan according to another aspect of the disclosure.

FIG. 9 is a block diagram illustrating a device for controlling a rotation angle of a swinging head of a fan according to another aspect of the disclosure, and the device can be implemented by software, hardware or a combination of the two. On the basis of embodiments illustrated in FIG. 8, the control module 13 includes a first control sub module 131 and a second control sub module 132.

The first control sub module 131 is configured to control the swinging head to continue to rotate in a current direction when the current rotation angle of the swinging head is less than the target rotation angle.

The second control sub module 132 is configured to control the swinging head to rotate in a direction opposite to the current direction when the current rotation angle of the swinging head is greater than or equal to the target rotation angle.

In at least one embodiment, referring to FIG. 9, the second control sub module 132 includes a first control unit 301 and a second control unit 302. The first control unit 301 is configured to control the swinging head to stop rotating when the current rotation angle of the swinging head is greater than or equal to the target rotation angle. The second control unit 302 is configured to control the swinging head to rotate in the direction opposite to the current direction after a preset time period.

As described above, with the device for controlling the rotation angle of the swinging head of the fan according to embodiments of the present disclosure, the control module can control the swinging head to rotate in real time and accurately based on the calculated current rotation angle of the swinging head and the target rotation angle, thereby improving an accuracy of the rotation of the swinging head.

In some embodiments, the angle feedback device includes a potentiometer, the parameter outputted by the angle feedback device includes a voltage value outputted by the potentiometer, and the correspondence relationship includes a voltage value corresponding to each rotation step.

The calculating module 12 is configured to take a quotient of the voltage value outputted by the potentiometer divided by the voltage value corresponding to each rotation step as the current rotation angle of the swinging head.

With the device for controlling the rotation angle of swinging head of the fan according to embodiments of the present disclosure, by using the potentiometer as the angle feedback device, the potentiometer and the brushless motor are cooperated to enable the brushless motor to drive the swinging head to swing, in the process of swinging, the voltage outputted by the potentiometer varies with the rotation of the swinging head, the acquiring module can acquire the voltage outputted by the potentiometer in real time, and the calculating module can calculate the current rotation angle of the swinging head according to the quotient of the voltage value outputted by the potentiometer and the voltage value corresponding to each rotation step, so that the control module can control the swinging head to rotate according to the current rotation angle of the swinging head and the preset target rotation angle. In the present embodiment, since the brushless motor has the advantages of long service life, the requirement of the user is satisfied, and at the same time, by setting the potentiometer, the disadvantages that the brushless motor cannot control the rotation angle of the swinging head are solved. Therefore, the embodiments of the present disclosure cannot only prolong the service life of the fan, but also accurately control the rotation angle of the swinging head, thereby improving the user experience.

In at least one embodiment, the angle feedback device includes an infrared photoelectric rotary encoder and an encoder read head, the parameter outputted by the angle feedback device includes a pulse signal outputted by the encoder read head according to a change of a scale of the infrared photoelectric rotary encoder, and the correspondence relationship includes a rotation angle of the swinging head corresponding to one pulse signal.

The calculating module 12 is configured to take a product of the number of the pulse signals outputted by the encoder read head and the rotation angle of the swinging head corresponding to the pulse signal as the current rotation angle of the swinging head.

With the device for controlling the rotation angle of swinging head of the fan according to embodiments of the present disclosure, by using the infrared photoelectric rotary encoder and the encoder read head as the angle feedback device, the infrared photoelectric rotary encoder, the encoder read head and the brushless motor are cooperated to enable the brushless motor to drive the swinging head to swing, in the process of swinging, the number of the pulse signals outputted by the encoder read head varies with the rotation of the swinging head, the acquiring module can acquire the pulse signals outputted by the encoder read head in real time, and the calculating module can calculate the current rotation angle of the swinging head according to the product of the number of the pulse signals outputted by the encoder read head and the rotation angle of the swinging head corresponding to the pulse signal, so that the control module can control the swinging head to rotate according to the current rotation angle of the swinging head and the preset target rotation angle. In the present embodiment, since the brushless motor has the advantages of long service life, the requirement of the user is satisfied, and at the same time, by setting the infrared photoelectric rotary encoder and the encoder read head, the disadvantages that the brushless motor cannot control the rotation angle of the swinging head are solved. Therefore, the embodiments of the present disclosure cannot only prolong the service life of the fan, but also accurately control the rotation angle of the swinging head, thereby improving the user experience.

Figure 10:
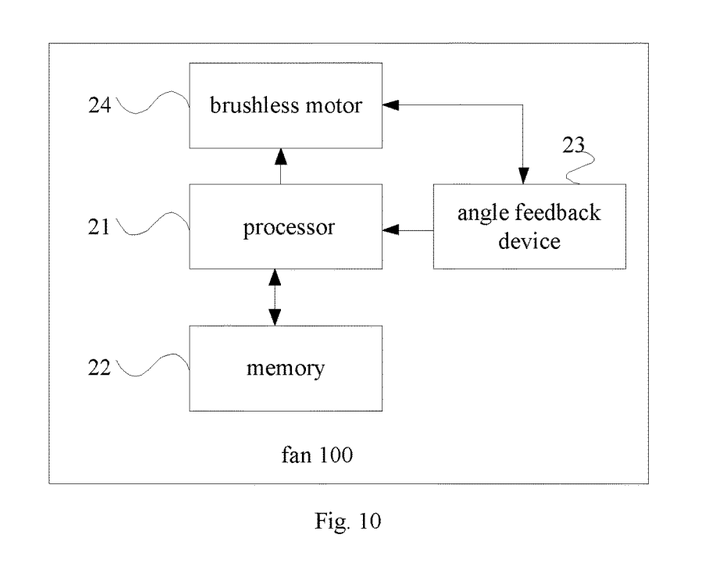
FIG. 10 is a block diagram illustrating a fan according to an aspect of the disclosure.

With respect to the devices in the above embodiments, the specific manners for performing operations for individual modules therein have been described in detail in the embodiments regarding the methods for identifying a gesture, which will not be elaborated The above describes the block diagram of internal functional modules of the device for controlling the rotation angle of the swinging head of the fan. FIG. 10 is a block diagram illustrating a fan according to an aspect of the disclosure. As illustrated in FIG. 10, the fan 100 includes a processor 21, a memory 22 configured to store instructions executable by the processor 21, an angle feedback device 23 and a brushless motor 24. The processor 21 is configured to acquire a parameter outputted by the angle feedback device 23, in which, the parameter outputted by the angle feedback device 23 varies with rotation of the swinging head; calculate a current rotation angle of the swinging head according to the parameter outputted by the angle feedback device and a preset correspondence relationship between parameters and angles; and control the swinging head to rotate according to the current rotation angle of the swinging head and a preset target rotation angle.

In the above embodiments of the fan, it should be understood that, the processor 21 may be a central processing unit (CPU), a microcontroller, and may be other general purpose processors, digital signal processors (DSP), application specific integrated circuits (ASIC), and the like. The general purpose processor may be a microprocessor, and may also be any conventional processor. The foregoing memory 22 may be a read-only memory (ROM), a random access memory (RAM), a flash memory, a hard disk or solid state hard disk. The acts of the method disclosed in embodiments of the present disclosure may be directly implemented by a hardware processor, or may be implemented by hardware and software modules in a processor.

In an aspect of the disclosure, there is provided a non-transitory computer-readable storage medium including instructions, such as a memory including instructions. The instructions can be executed by the processor 21 to perform a method for controlling a rotation angle of a swinging head of a fan. For example, the non-transitory computer-readable storage medium may be a ROM, a random access memory (RAM), a CD-ROM, a magnetic tape, a floppy disk, an optical data storage device, or the like.

A non-transitory computer-readable storage medium that, when an instruction in the storage medium is executed by the processor 21 of the fan 100, enables the fan 100 to perform the above method for controlling the rotation angle of swinging head of the fan. The method includes: acquiring a parameter outputted by the angle feedback device, in which, the parameter outputted by the angle feedback device varies with rotation of the swinging head; calculating a current rotation angle of the swinging head according to the parameter outputted by the angle feedback device and a preset correspondence relationship between parameters and angles; and controlling the swinging head to rotate according to the current rotation angle of the swinging head and a preset target rotation angle by using the brushless motor.

In at least one embodiment, controlling the swinging head to rotate according to the current rotation angle of the swinging head and the preset target rotation angle includes: controlling the swinging head to continue to rotate in a current direction when the current rotation angle of the swinging head is less than the target rotation angle; and controlling the swinging head to rotate in a direction opposite to the current direction when the current rotation angle of the swinging head is greater than or equal to the target rotation angle.

In at least one embodiment, controlling the swinging head to rotate in the direction opposite to the current direction when the current rotation angle of the swinging head is greater than or equal to the target rotation angle includes: controlling the swinging head to stop rotating when the current rotation angle of the swinging head is greater than or equal to the target rotation angle; and controlling the swinging head to rotate in the direction opposite to the current direction after a preset time period.

In at least one embodiment, the angle feedback device includes a potentiometer, the parameter outputted by the angle feedback device includes a voltage value outputted by the potentiometer, and the correspondence relationship includes a voltage value corresponding to each rotation step.

The act of calculating the current rotation angle of the swinging head according to the parameter outputted by the angle feedback device and the preset correspondence relationship between parameters and angles includes: taking a quotient of the voltage value outputted by the potentiometer divided by the voltage value corresponding to each rotation step as the current rotation angle of the swinging head.

In at least one embodiment, the angle feedback device includes an infrared photoelectric rotary encoder and an encoder read head, the parameter outputted by the angle feedback device includes a pulse signal outputted by the encoder read head according to a change of a scale of the infrared photoelectric rotary encoder, and the correspondence relationship includes a rotation angle of the swinging head corresponding to one pulse signal.

The act of calculating the current rotation angle of the swinging head according to the parameter outputted by the angle feedback device and the preset correspondence relationship between parameters and angles includes: taking a product of the number of the pulse signals outputted by the encoder read head and the rotation angle of the swinging head corresponding to the pulse signal as the current rotation angle of the swinging head.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling a rotation angle of a swinging head of a fan, comprising:
    driving, by a brushless motor in the fan, the swinging head to rotate, wherein an angle feedback device is arranged on the swinging head, and the angle feedback device comprises a potentiometer;
    acquiring a parameter outputted by the angle feedback device, wherein the parameter outputted by the angle feedback device varies with rotation of the swinging head, and the parameter outputted by the angle feedback device comprises a voltage value outputted by the potentiometer;
    calculating a current rotation angle of the swinging head according to the parameter and a preset correspondence relationship between parameters and angles by taking a quotient of the voltage value outputted by the potentiometer divided by a voltage value corresponding to each rotation step as the current rotation angle of the swinging head, wherein the preset correspondence relationship comprises the voltage value corresponding to each rotation step; and
    controlling the swinging head to rotate according to the current rotation angle of the swinging head and a preset target rotation angle by using the brushless motor.

2. The method according to claim 1, wherein controlling the swinging head to rotate according to the current rotation angle of the swinging head and the preset target rotation angle comprises:
    controlling the swinging head to continue to rotate in a current direction when the current rotation angle of the swinging head is less than the target rotation angle; and
    controlling the swinging head to rotate in a direction opposite to the current direction when the current rotation angle of the swinging head is greater than or equal to the target rotation angle.

3. The method according to claim 2, wherein controlling the swinging head to rotate in the direction opposite to the current direction when the current rotation angle of the swinging head is greater than or equal to the target rotation angle comprises:
    controlling the swinging head to stop rotating when the current rotation angle of the swinging head is greater than or equal to the target rotation angle; and
    controlling the swinging head to rotate in the direction opposite to the current direction after a preset time period.

4. A fan, comprising:
    a processor; and
    a memory configured to store instructions executable by the processor;
    an angle feedback device comprising a potentiometer;
    a brushless motor;
    wherein the processor is configured to:
    acquire a parameter outputted by the angle feedback device, wherein the parameter outputted by the angle feedback device varies with rotation of a swinging head, wherein the parameter outputted by the angle feedback device comprises a voltage value outputted by the potentiometer;
    calculate a current rotation angle of the swinging head according to the parameter outputted by the angle feedback device and a preset correspondence relationship between parameters and angles by taking a quotient of the voltage value outputted by the potentiometer divided by a voltage value corresponding to each rotation step as the current rotation angle of the swinging head, wherein the preset correspondence relationship comprises the voltage value corresponding to each rotation step; and
    control the swinging head to rotate according to the current rotation angle of the swinging head and a preset target rotation angle.

5. The fan according to claim 4, wherein the processor is configured to control the swinging head to rotate according to the current rotation angle of the swinging head and a preset target rotation angle by acts of:
    controlling the swinging head to continue to rotate in a current direction when the current rotation angle of the swinging head is less than the target rotation angle; and
    controlling the swinging head to rotate in a direction opposite to the current direction when the current rotation angle of the swinging head is greater than or equal to the target rotation angle.

6. The fan according to claim 5, wherein the processor is configured to control the swinging head to rotate in the direction opposite to the current direction when the current rotation angle of the swinging head is greater than or equal to the target rotation angle by acts of:

controlling the swinging head to stop rotating when the current rotation angle of the swinging head is greater than or equal to the target rotation angle; and controlling the swinging head to rotate in the direction opposite to the current direction after a preset time period.

7. A non-transitory computer-readable storage medium having stored therein instructions that, when executed by a processor of a fan, causes the fan to perform a method for controlling a rotation angle of a swinging head of a fan, the method comprising:

acquiring, by the fan comprising an angle feedback device and a brushless motor, a parameter outputted by the angle feedback device, wherein the angle feedback device comprises a potentiometer, the parameter outputted by the angle feedback device varies with rotation of the swinging head, and the parameter outputted by the angle feedback device comprises a voltage value outputted by the potentiometer;

calculating a current rotation angle of the swinging head according to the parameter outputted by the angle feedback device and a preset correspondence relationship between parameters and angles by taking a quotient of the voltage value outputted by the potentiometer divided by a voltage value corresponding to each rotation step as the current rotation angle of the swinging head, wherein the preset correspondence relationship comprises the voltage value corresponding to each rotation step; and controlling the swinging head to rotate according to the current rotation angle of the swinging head and a preset target rotation angle by using the brushless motor.

8. The non-transitory computer-readable storage medium according to claim 7, wherein controlling the swinging head to rotate according to the current rotation angle of the swinging head and the preset target rotation angle comprises:

controlling the swinging head to continue to rotate in a current direction when the current rotation angle of the swinging head is less than the target rotation angle; and controlling the swinging head to rotate in a direction opposite to the current direction when the current rotation angle of the swinging head is greater than or equal to the target rotation angle.

9. The non-transitory computer-readable storage medium according to claim 8, wherein controlling the swinging head to rotate in the direction opposite to the current direction when the current rotation angle of the swinging head is greater than or equal to the target rotation angle comprises:

controlling the swinging head to stop rotating when the current rotation angle of the swinging head is greater than or equal to the target rotation angle; and controlling the swinging head to rotate in the direction opposite to the current direction after a preset time period.

10. The method according to claim 1, wherein the preset target rotation angle is acquired by the fan from a mobile terminal.

11. The method according to claim 1, wherein the voltage value of each rotation step is preset.

12. The fan according to claim 4, wherein the preset target rotation angle is acquired by the fan from a mobile terminal.

13. The fan according to claim 4, wherein the voltage value of each rotation step is preset.

14. The non-transitory computer-readable storage medium according to claim 7, wherein the preset target rotation angle is acquired by the fan from a mobile terminal.

15. The non-transitory computer-readable storage medium according to claim 7, wherein the voltage value of each rotation step is preset.

* * * * *